Patented Jan. 7, 1930

1,742,386

UNITED STATES PATENT OFFICE

STANLEY FOWLER, OF BRADFORD, AND EDWIN EDSER, OF LONDON, ENGLAND

PRESERVATION OF EGGS

No Drawing. Application filed March 11, 1927, Serial No. 174,692, and in Great Britain April 16, 1926.

This invention comprises improvements in or relating to the preservation of eggs.

Processes are known for the preservation of eggs, wherein the eggs are coated with a layer of some viscous or waxy material for the purpose of preventing access of air to the egg. In the processes hitherto proposed the protective layer has usually comprised some water-absorbent colloid such as gum, gelatine or the like. Coating of eggs with oil or wax, thereby more or less closing the pores of the shell, has also been used to prevent evaporation of water from the eggs during storage.

The action of the coatings referred to depends upon their capacity to exclude air from the egg, but for various reasons such exclusion is imperfect. The colloids being water-absorbent are capable of absorbing water from the interior of the egg and the absorbed water will evaporate from the exposed surface of the colloid coating and the loss of water entails the ingress of air, either through imperfections in the coating or due to porosity, which most colloids possess to a sufficient degree to allow the passage of a fixed gas. Attempts to coat eggs with oils or waxes have not met with much success probably because the viscosity of the applied material may prevent its access to the pores and even a few free pores will permit of evaporation. We have found that improved results can be obtained if evaporation of water from the eggs to be preserved is prevented as hereinafter described. In this way, there is no tendency for air to enter since entrance of air can only take place when an equivalent volume of water has first been evaporated.

When a porous medium such as an egg shell is brought into contact with a liquid, the liquid is impelled by very powerful capillary forces to enter the pores and to fill them, provided that a small or evanescent angle is made by the liquid in contact with the solid which forms the walls of the pores. On the other hand, if a large contact angle is made by the liquid in contact with a solid, the liquid will have no tendency to enter pores in the solid. Thus the loss of water, from, say, an egg may be regarded as due to water being forced into the pores of the shell by capillary forces, and when the water reaches the outer surface of the shell it evaporates and is replaced by additional water from the interior, while air meanwhile is forced into the interior to take the place of the extruded water. If the water made a large contact angle with the walls of the pores, it would not be extruded and air would not enter the egg.

Similarly it can be ensured that a wax enters the pores if it be applied to the eggshell in the form of a thin liquid which makes a sufficiently small contact angle with the shell to cause the liquid to creep into the pores. Deposition of a suitable wax on the walls of the pores will ensure that the contact angle made by water is sufficiently large to prevent the extrusion of water by capillary forces.

Accordingly, this invention comprises a method for the preservation of eggs which consists in applying to the eggs a neutral non-putrefying wax which materially increases the contact angle between water and the walls of the pores in the form of a thin liquid (for example a solution in a solvent) which makes a sufficiently small contact angle with the shell substance to ensure that the liquid will enter and coat the walls of the pores therein.

Preferably the wax consists of or contains cholesterol (for example, the wax consists of wool-fat). Cholesterol wax has the property of adhering very tenaciously to surfaces covered by it and also of imparting a similar property to greasy substances which contain it in substantial amounts.

The invention particularly comprises a process for the preservation of eggs which consists in applying to the eggs a solution of wool-fat in a volatile solvent, and thereafter evaporating the solvent.

The coating can be effected by dipping the eggs into the solution. The layer of wax deposited on the walls of the pores will suffice to prevent the extrusion of water from the interior of the egg, even when the pores are merely coated and not completely filled with wax. We have found that an egg that has been treated in this way loses little or no water in a long period of time, and satisfactory preservation of the contents of the egg is ensured.

The preferred solution to be applied to the eggs consists of a solution of wool-fat in a solvent containing trichlorethylene or other body which renders it non-inflammable. The wool-fat may be prepared as described in United States Patent No. 1,610,854.

*Example*

Eggs laid on May 5th 1926, were treated on the same day in accordance with the invention by dipping them in a solution comprising 25% of purified wool-fat and 75% trichlorethylene. They were weighed immediately after treatment and at intervals afterwards. It was found that after three months' storage in a room at ordinary temperature, the loss of weight (due to evaporation of water from the interior) amounted only to 0.7%. On December 6th, 1926, some of the eggs were examined by breaking them, and it was found that they had retained all the characteristics of new laid eggs. The yolks retained their characteristic rounded shapes and the whites were colourless. Other eggs of the batch were boiled and eaten and were found to be equal to new-laid eggs. In boiling the eggs it was found that air from their air-chambers escaped readily, and the shells did not crack.

We claim:—

1. A method for the preservation of eggs which comprises treating the eggs with a neutral non-putrefying water repellant wax dissolved in a suitable solvent capable of penetrating within the pores of the shells, and evaporating the solvent so as to cause the wax contained within the pores of said eggs to be deposited upon the walls of said pores without substantially affecting the porosity of the shell.

2. A method for the preservation of eggs as set out in claim 1 wherein the wax comprises a cholesterol compound.

In testimony whereof we have signed our names to this specification.

STANLEY FOWLER.
EDWIN EDSER.